United States Patent [19]

Mankowski et al.

[11] 3,961,827

[45] June 8, 1976

[54] STRESS-RELIEVED WHEEL ASSEMBLY AND METHOD THEREFOR

[75] Inventors: Aleksander Mankowski, Downers Grove; Eugene M. Poplawski; Jack H. Kraina, both of Aurora, all of Ill.

[73] Assignee: Caterpillar Tractor Co., Peoria, Ill.

[22] Filed: June 20, 1975

[21] Appl. No.: 588,920

[52] U.S. Cl. .............................. 301/132; 301/1; 180/88; 301/125
[51] Int. Cl.² .............................................. B60B 35/00
[58] Field of Search ............... 301/1, 2, 105 R, 106, 301/124 R, 124 H, 125, 126, 131, 132; 180/75, 85, 88, 70 R, 43 A, 43 B, 43 C; 74/606 R; 285/405; 29/446, 526

[56] References Cited
UNITED STATES PATENTS 2,501,579   3/1950   Pointer ............................ 301/132

FOREIGN PATENTS OR APPLICATIONS 1,210,291   10/1970   United Kingdom ................. 285/405

*Primary Examiner*—Stanley H. Tollberg
*Assistant Examiner*—D. W. Keen
*Attorney, Agent, or Firm*—Phillips, Moore, Weissenberger Lempio & Strabala

[57] ABSTRACT

A wheel assembly comprises an axle housing secured to the frame of a vehicle, a spindle secured to the axle housing and a wheel rotatably mounted on the spindle. The axle housing and wheel spindle are secured together at radial flanges thereof by a plurality of circumferentially disposed bolts. A concavity is formed on the inner face of each of the flanges to impose compressive forces on radially inner portions thereof when the flanges are drawn and secured together by the bolts.

13 Claims, 4 Drawing Figures

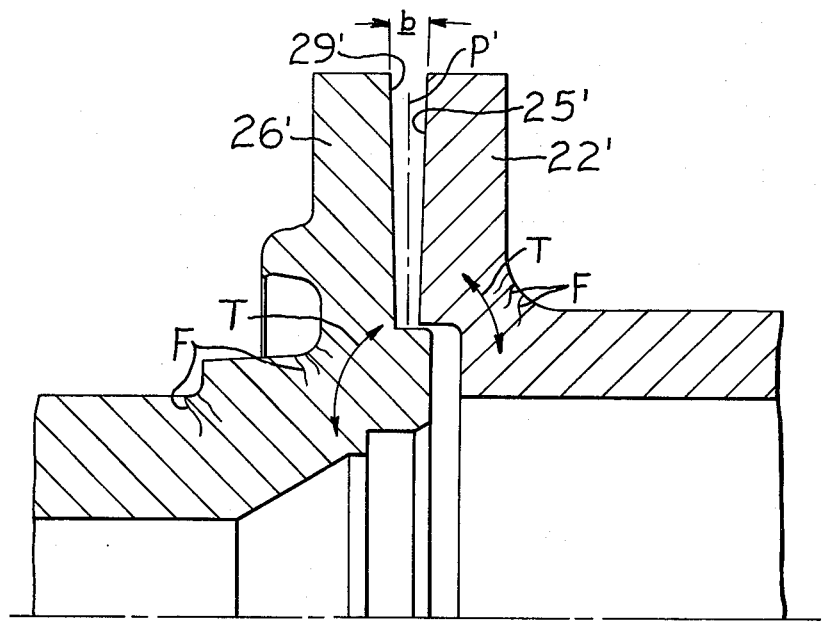
FIG_4_
PRIOR ART
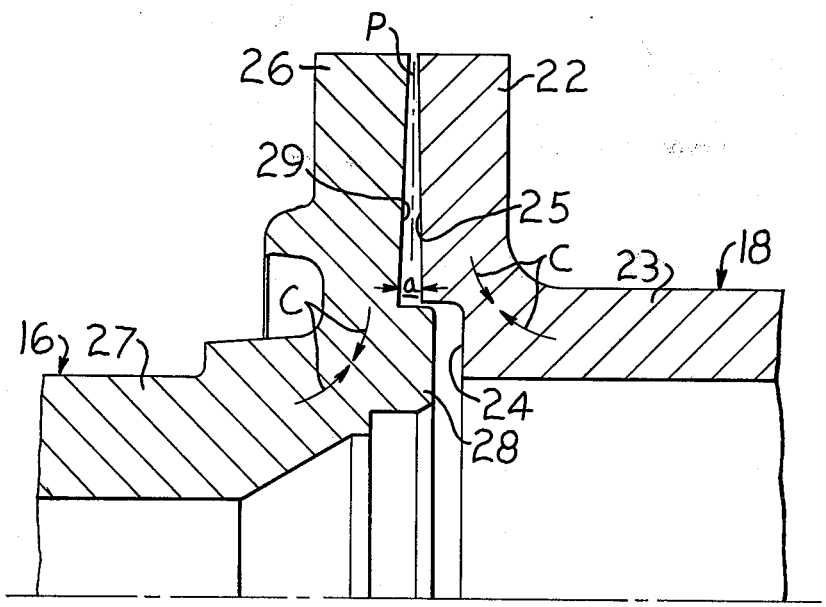
FIG_3_

STRESS-RELIEVED WHEEL ASSEMBLY AND METHOD THEREFOR

BACKGROUND OF THE INVENTION

This invention relates to means for relieving stresses in the axle housing and spindle of a wheel assembly, adapted for use on a construction vehicle. Construction vehicles, such as wheel loaders and the like, normally have each wheel thereof rotatably mounted on a spindle secured to the end of an axle housing. Such an arrangement facilitates expeditious removal of the wheel assembly, including the wheel, a drive axle, a brake package, bearings and attendant components, for servicing purposes.

A radial flange of the spindle is normally secured to a radial flange of the axle housing by a plurality of circumferentially disposed bolts to facilitate such removal of the wheel assembly. The wheel assembly, due to its cantilevered relationship on the side of the vehicle, tends to impose tensile stresses on such flanges, as depicted by arrows T in FIG. 3 of the drawings.

SUMMARY OF THIS INVENTION

An object of this invention is to provide an improved wheel assembly and method whereby a wheel spindle and axle housing thereof are stress-relieved. The axle housing and wheel spindle each have an annular flange formed thereon and a dish-shaped concavity is formed on an inner face of at least one of the flanges prior to drawing and securing them together. Upon such securance, compressive forces are imposed on radially inner portions of the flange having the concavity formed thereon. In the preferred embodiment of this invention, such a concavity is formed on the inner face of each of the flanges to thus provide the stress-relieving function for both the axle housing and wheel spindle.

BRIEF DESCRIPTION OF THE DRAWINGS

Other objects of this invention will become apparent from the following description and accompanying drawings wherein;

FIG. 3 is a view illustrating a pair of unsecured flanges employed on the axle housing and wheel spindle of the wheel assembly of this invention; and FIG. 4 is an enlarged sectional view similar to FIG. 3, but illustrating a pair of prior art flanges.

DETAILED DESCRIPTION OF THE INVENTION

Figure 1:
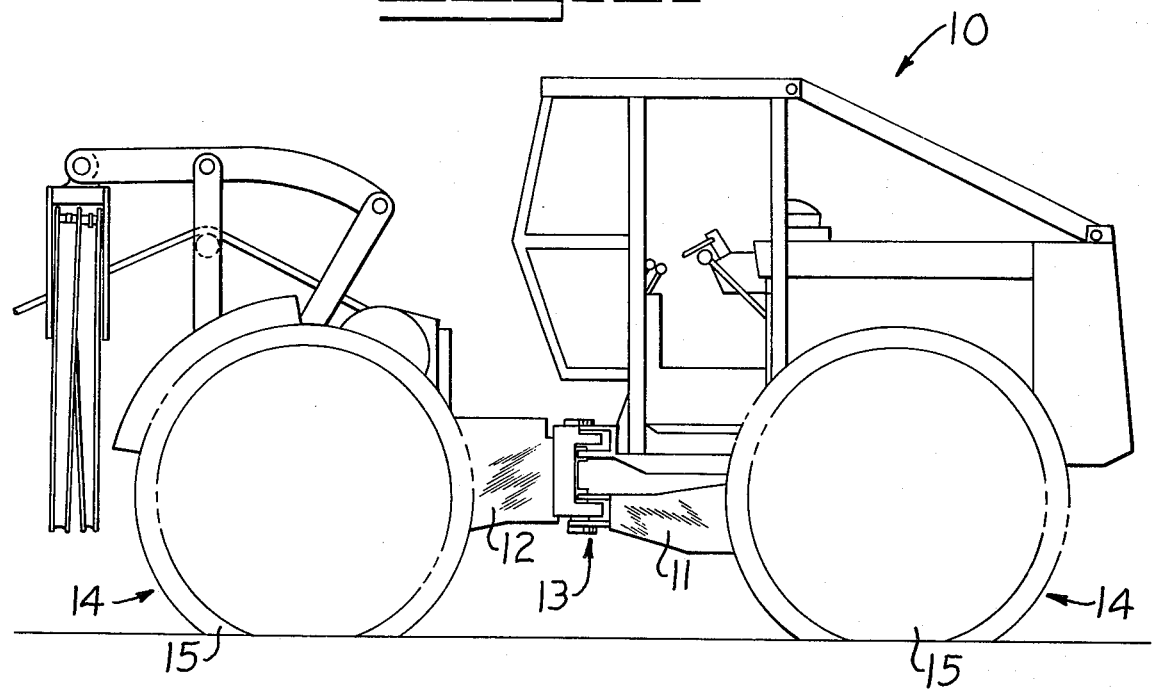
FIG. 1 is a side elevational view of a construction vehicle having four wheel assemblies of this invention mounted thereon.

FIG. 1 illustrates a construction vehicle 10 comprising a front frame 11 articulated to a rear frame 12 by a pin connection 13. Steering cylinders (not shown) are suitably interconnected between the two frames for steering purposes. The frames are mounted for movement on four wheel assemblies 14 (two shown) adapted to be driven by a power-takeoff from the power plant of the vehicle.

Figure 2:
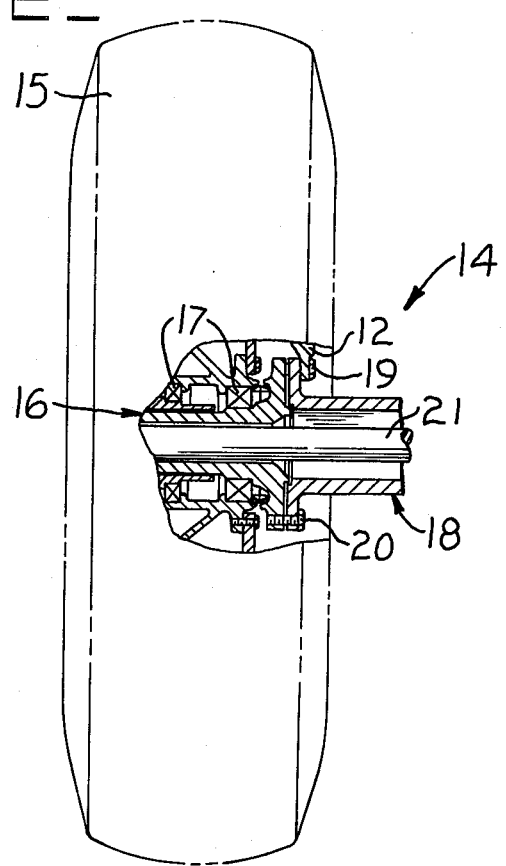
FIG. 2 is an enlarged and partially sectioned elevational view of one of the wheel assemblies.

Referring to FIG. 2, each wheel assembly 14 comprises a wheel 15 rotatably mounted on a tubular spindle 16 by a pair of axially spaced annular bearing means 17. A tubular axle housing 18 is secured to frame 12 by bolts 19 (one shown) whereas the axle housing is secured to spindle 16 by a plurality of circumferentially disposed bolts 20 (one shown). An axle 21, constituting the final power takeoff from the power plant of the vehicle, is operatively connected at its outer end to a final drive (not shown) for selectively rotating wheel 15 on the spindle.

Referring to FIG. 3, disclosing spindle 16 and axle housing 18 in unsecured relationship, the axle housing comprises an annular flange 22 extending radially outwardly from the outboard end of a tubular hub 23 thereof. An annular recess 24 is formed internally on an outboard end of the hub and a dish or frustro-conically shaped concavity is formed on an inner face 25 of flange 22. Wheel spindle 16 comprises an annular flange 26 extending radially outwardly from an inboard end of a tubular hub 27 thereof.

An annular pilot and support boss 28 is formed integrally on an inboard end of hub 27 to fit closely within recess 24 upon drawing and securance of flanges 22 and 26 together (FIG. 2). An inner face 29 of flange 26 is positioned in axial opposition to inner face 25 of flange 22 and also has a dish or frusto-conically shaped concavity formed thereon. Faces 25 and 29 converge radially outwardly to normally define an acute angle $a$ therebetween prior to drawing and securance of the flanges together. Such angle is preferably selected from the range of from 0°2' to 1°, when viewed in cross section in FIG. 3.

A method for securing wheel assembly 14 on axle housing 18 to provide the above-mentioned stress-relieving desiderata will now be described. Subsequent to forming the dish-shaped concavities on faces 25 and 29 of flanges 22 and 26, respectively, such inner faces are disposed in abutting relationship at radially outer portions thereof. Bolts 20 are then tightened to draw and secure flanges 22 and 26 together at their respective faces at a plane $P$ to simultaneously place radially inner portions of the flanges and adjacent ends of hubs 23 and 27 in compression. Such compression is generally depicted by arrows C in FIG. 3.

In contrast thereto, FIG. 4 illustrates a prior art construction wherein a pair of corresponding unsecured flanges 22' and 26' tend to induce tensile forces, illustrated by arrows T, when the flanges are drawn and secured together at a plane P'. In particular, inner faces 25' and 29' of the respective flanges comprise inverted dish-shaped configurations which converge towards each other in a radial direction to define an acute angle $b$ therebetween. Tensile forces T may thus induce fractures F in the proximity of the radially inner portions of flanges 22' and 26'.

Although during fabrication it is desirable to form angle $b$ as 0°, machining of faces 25' and 26' will oftentimes result in the acute angle illustrated. Thus applicant's above-described invention wherein angle $a$ (FIG. 3) is purposely formed between outwardly converging faces 25 and 29 avoids such a machining problem.

We claim:
1. A stress-relieved wheel assembly comprising
    an axle housing, adapted for attachment to a frame of a vehicle, having an annular first flange disposed to extend radially outwardly on an outboard end thereof,
    a wheel spindle, adapted to have a wheel rotatably mounted thereon, having an annular second flange disposed to extend radially outwardly on an inboard end thereof to position an inner face thereof in abutting relationship with an inner face of said first flange, means forming at least a generally frustro-conically shaped concavity on at least one of the inner faces of said first and second flanges, and fastening means drawing and securing said first and second flanges together for imposing a compressive force on radially inner portions of said flange having said concavity formed thereon.

2. The wheel assembly of claim 1 wherein each of said first and second flanges has a said concavity formed on the inner face thereof.

3. The wheel assembly of claim 2 wherein said concavities define an included angle therebetween, when viewed in cross section, selected from the range of from 0°2′ to 1°, said inner faces converging radially outwardly relative to each other.

4. The wheel assembly of claim 1 wherein said fastening means comprises a plurality of bolts.

5. The wheel assembly of claim 1 wherein said first flange is formed integrally on a tubular first hub of said axle housing and said second flange is formed integrally on a tubular second hub of said wheel spindle.

6. The wheel assembly of claim 5 wherein an annular boss is formed integrally on an inboard end of said second hub and means form an annular recess on an outboard end of said first hub, said boss fitted closely with said recess.

7. The wheel assembly of claim 5 wherein said axle housing is secured on a frame of a vehicle.

8. The wheel assembly of claim 7 further comprising a wheel rotatably mounted on said spindle.

9. A method for stress-relieving a wheel assembly wherein an annular first flange of an axle housing is secured to an annular second flange of a wheel spindle comprising the steps of forming a dish-shaped concavity on an inner face of at least one of said first and second flanges, disposing the inner faces of said first and second flanges in abutting relationship at radially outer portions thereof with the opposing faces of said flanges converging radially outwardly to define an acute angle therebetween, and drawing and securing said first and second flanges together at their respective faces and simultaneously placing radially inner portions of the flange having said concavity formed thereon in compression.

10. The method of claim 9 wherein said forming step comprises forming a said dish-shaped concavity on the inner face of each of said first and second flanges.

11. The method of claim 10 wherein said forming step comprises forming each of said convatities into a frusto-conical shape wherein said acute angle is selected from the range of from 0°2′ to 1°.

12. The method of claim 9 further comprising the step of securing said axle housing to a frame of a vehicle.

13. The method of claim 12 further comprising rotatably mounting a wheel on said spindle.

* * * * *

UNITED STATES PATENT AND TRADEMARK OFFICE
CERTIFICATE OF CORRECTION

PATENT NO. : 3,961,827
DATED : June 8, 1976
INVENTOR(S) : ALEKSANDER MANKOWSKI, EUGENE M. POPLAWSKI,
    JACK H. KRAINA and ROBERT J. ULLSTRUP It is certified that error appears in the above-identified patent and that said Letters Patent are hereby corrected as shown below:

Title Page at "[75] Inventors:"

Please add ROBERT J. ULLSTRUP of Naperville, Illinois.

Signed and Sealed this

Nineteenth Day of October 1976

[SEAL]

Attest:

RUTH C. MASON
*Attesting Officer*

C. MARSHALL DANN
*Commissioner of Patents and Trademarks*